United States Patent [19]

Eastwood et al.

[11] 3,886,578

[45] May 27, 1975

[54] LOW OHMIC RESISTANCE PLATINUM CONTACTS FOR VANADIUM OXIDE THIN FILM DEVICES

[75] Inventors: H. Keith Eastwood, Beaconsfield, Quebec; Barry A. Noval, Cote-St-Luc, Quebec; Marcus Arts, Lonqueuil, Quebec; Michael Leitner, Dollard Des Ormeaux, Quebec, all of Canada

[73] Assignee: Multi-State Devices Ltd., Quebec, Canada

[22] Filed: Feb. 26, 1973

[21] Appl. No.: 335,651

[52] U.S. Cl. .......................... 357/4; 357/68; 357/69; 357/71; 252/512; 252/518

[51] Int. Cl. .......................... H01l 3/00; H01l 5/00

[58] Field of Search .......... 317/234, 8, 8.1, 5.3, 5.4, 317/48.7; 252/512, 518

[56] References Cited

UNITED STATES PATENTS

| | | | |
|---|---|---|---|
| 3,377,697 | 4/1968 | Hobbs | 317/234 M |
| 3,402,131 | 9/1968 | Futaki et al. | 252/512 |
| 3,483,110 | 12/1969 | Rozgonvi | 317/234 S |
| 3,560,256 | 2/1971 | Abrams | 317/234 S |
| 3,562,040 | 2/1971 | Garies | 317/234 L |
| 3,614,480 | 10/1971 | Berglund | 317/235 |
| 3,616,348 | 10/1971 | Greig | 317/234 L |
| 3,667,008 | 5/1972 | Katnack | 317/235 AT |

*Primary Examiner*—Andrew J. James
*Attorney, Agent, or Firm*—Spencer & Kaye

[57] ABSTRACT

A thin film device having a low ohmic contact resistance comprising a plate-like substrate of electrically insulating material, spaced platinum contacts deposited on the surface of such substrate, and a thin film of vanadium oxide deposited over such substrate and bridging a portion of the spaced platinum contacts. The vanadium oxide film has a low ohmic contact resistance with the platinum film and also a good adhesion to such platinum film.

8 Claims, 2 Drawing Figures

Patented May 27, 1975 3,886,578
FIG I
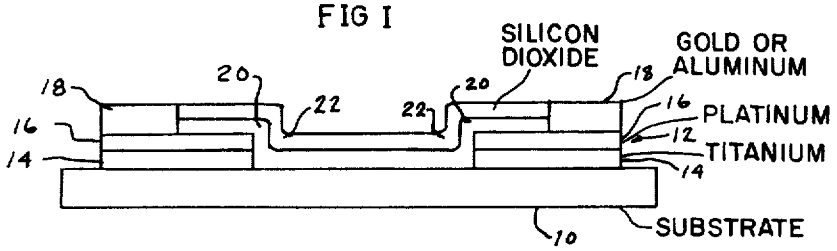
FIG 2
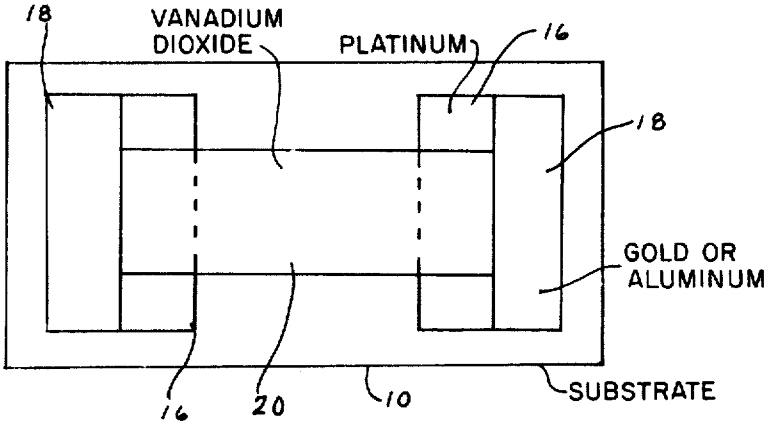

LOW OHMIC RESISTANCE PLATINUM CONTACTS FOR VANADIUM OXIDE THIN FILM DEVICES

This invention relates to thin film devices and more particularly to vanadium oxide thin film devices having a low ohmic contact resistance.

BACKGROUND OF THE INVENTION

It is known in the art to provide contacts for thin film devices made of vanadium oxides such as vanadium dioxide ($VO_2$) or vanadium sesquioxide ($V_2O_3$) by evaporating suitable metals onto the vanadium oxide thin film through a mask. However, there are limitations on the configuration and size of contacts made using evaporation through a mask because it is difficult to keep the mask in contact with the vanadium oxide film. In addition, it exposes the vanadium oxide film to vacuum during the process which can adversely affect the properties of the film. Furthermore, there is often poor adhesion of the metal to the vanadium oxide film. Moreover, there is often a relatively high ohmic contact resistance between the metal and the vanadium oxide film.

It has been disclosed in U.S. application Ser. No. 293,323 filed Sept. 28, 1972 and assigned to the same interest as the present application to make contacts for vanadium oxide devices by depositing spaced contacts of nichrome on a substrate, sputtering a vanadium oxide film over the substrate, and then removing a portion of the vanadium oxide film to expose the nichrome contacts while leaving a bridge of vanadium oxide across the nichrome contacts. However, since vanadium oxide is deposited at about 400°C, there are often chemical reactions between vanadium oxide and nichrome and such reactions make a poor contact between vanadium oxide and nichrome resulting in a relatively high ohmic contact resistance between the two films varying between 25–250 ohms. For the purposes of this patent application, we define contact resistance as the accumulation of the following three distributed resistances: the series resistance in the vanadium oxide film overlapping the contact metal, the interface resistance between the vanadium oxide film and the contact metal, and the series resistance in the contact metal underlying the vanadium oxide.

It is therefore the object of the present invention to reduce the ohmic contact resistance of the connection to the vanadium oxide film to a minimum value.

SUMMARY OF THE INVENTION

The thin film device having a low ohmic contact resistance, in accordance with the invention, comprises a plate-like substrate of electrically insulating material, spaced platinum contacts deposited on the surface of such substrate, and a thin film of vanadium oxide deposited over the substrate and bridging a portion of the spaced platinum contacts. The vanadium oxide film has a low ohmic contact resistance with the platinum contacts and a good adhesion to such contacts. Such resistance has been found to be consistently less than 10 ohms.

The substrate of the thin film device in accordance with the invention is preferably made of sapphire material although it could also be made of polycrystalline alumina, beryllium oxide, quartz or glass. When a sapphire, glass or quartz substrate is used, titanium contacts are first deposited on the substrate and the platinum contacts deposited over the titanium contacts because platinum alone has poor adhesion to sapphire, glass or quartz. Of course, other reactive metals could be used to enhance the adhesion of the platinum film.

In order to facilitate the connections to the platinum contacts, a layer of gold is preferably deposited over the platinum contacts so as to facilitate the bonding of output leads to the gold layer. Other soft metals, such as aluminum, could also be used.

The process for making the above-mentioned thin film device comprises the steps of depositing a film of platinum on a substrate of electrically insulating material, removing the non desired portion of the platinum film to leave spaced platinum contacts, depositing a thin film of vanadium oxide over the substrate and the platinum contacts, and removing the vanadium oxide film over a portion of the platinum contacts so as to expose the platinum contacts while leaving enough vanadium oxide to bridge the edges of the platinum contacts.

When the substrate is made of sapphire, quartz or glass material, a film of titanium or other reactive metals is first deposited on the substrate and the film of platinum deposited over the reactive metal film to facilitate adhesion of platinum to the substrate. The non desired portions of both films are removed together to leave spaced contacts.

When it is desired to have a gold or aluminum layer over the platinum film, such layer is deposited over the platinum film and the gold or aluminum is first etched back from the portion of the platinum film which is to be contacted by the vanadium oxide film so as to leave the edges of the platinum contacts uncovered for the vanadium oxide to be deposited thereon. The non desired portions of the platinum film and of the titanium film when there is one are subsequently removed.

Finally, a layer of silicon dioxide may be deposited over the vanadium oxide film and over the gold or aluminum layer so as to protect the thin film device from the ambient and improve the stability of the film. Of course, a portion of the silicon dioxide film is removed to uncover the gold or aluminum contacts.

DESCRIPTION OF DRAWINGS

The invention will now be disclosed, by way of example, with reference to a preferred embodiment thereof illustrated in the accompanying drawings in which:

FIG. 1 illustrates a schematic side view of a thin film device in accordance with the invention having a low ohmic resistance contact; and FIG. 2 is a top view of the device of FIG. 1 prior to the deposition of the silicon dioxide film thereon.

DETAILED DESCRIPTION

Referring to FIGS. 1 and 2, there is shown a schematic diagram of a thin film temperature sensor comprising a substrate 10 of electrically insulating material which may have, for example, a width of 0.015 inch, a length of 0.030 inch and a thickness of 0.010 inch. Such substrate is made of sapphire material although it may be made of polycrystalline alumina, beryllium oxide, quartz or glass. Two spaced contacts 12 are provided one at each end of such substrate, each contact consisting of a film of titanium 14 deposited over the substrate 10, a film of platinum 16 deposited over the titanium film 14 and a gold layer 18 deposited over the platinum film 16. The titanium film may have a thickness in the range of 100–500 AU (Angstrom Units) and the gold and platinum films a thickness of 1000–500 AU. A film of vanadium oxide 20 such as vanadium dioxide ($VO_2$) or vanadium sesquioxide ($V_2O_3$) is deposited over the sapphire substrate 10 and over the edges of the platinum contacts 16 so as to bridge the two platinum contacts. The thickness of the vanadium oxide film is between 1000 and 5000 AU. Finally, an overcoating 22 of silicon dioxide of suitable thickness is deposited over the vanadium oxide layer 20 to protect the entire device from the ambient.

The above disclosed substrate may be mounted in a standard T05 header provided with at least two contact pins and connections made between the pins and the gold contacts 18 by wire bonding.

In the fabrication of the device shown in FIGS. 1 and 2, the substrate 10 is first coated over its whole surface with a titanium film by any known technique such as sputtering. In a second sputtering operation, a film of platinum is deposited over the titanium film. Finally, a third layer of gold is sputtered or evaporated also by a known technique over the platinum film. By a photoresist process, well known in the art and using a photographic mask to define the gold pattern, the gold film is etched back from the central portion of the substrate 10 leaving the gold contacts 18 as illustrated in FIGS. 1 and 2. Then, by a further photoresist process, the platinum and titanium films are etched back from the central portion of the substrate, but to a slightly smaller extent, so leaving the shoulders upon which, as illustrated in FIG. 1, the vanadium oxide film 20 is to be deposited. The vanadium oxide film 20 is then deposited by a reactive sputtering process at a temperature of about 400°C in an argon-oxygen atmosphere. Oxygen pressures used are in the range of 0.7 to 2.5 mTorr made up to a total pressure of 7.5 mTorr with argon. The radio frequency power of the sputtering process is about 350 W to give a deposition rate which varies from 50 to 35 A/min with increasing oxygen pressure. Such a process is disclosed in more detail in an article entitled "Transport and Structural Properties of $VO_2$ Films" published by Clarence C. Y. Kwan et al. in Applied Physics Letters, Vol. 20, No. 2, 15 Jan. 1972. Of course, other techniques could be used for depositing the vanadium oxide film 20 on the substrate. The vanadium oxide film is in the polycrystalline condition and covers the central part of the substrate 10 and the edges of the platinum layer 16 so as to be connected in series with the contacts 18. The vanadium oxide pattern is subsequently defined by a photoresist process and the vanadium oxide film etched back from the gold contacts 18. Finally, the vanadium oxide film is covered with an overcoating of silicon dioxide to protect the device from the ambient and improve the stability of the film. Of course, the silicon dioxide film will have to be etched back to expose the gold contacts.

The etching operations mentioned above are preferably chemical when it is desired to remove gold, titanium, silicon dioxide and vanadium oxide, but platinum is preferably removed using a sputter etch technique.

It has been found that platinum makes very good contact with vanadium oxide films. Platinum is stable at 400°C which is the temperature used for sputtering vanadium oxide onto the edges of platinum contacts 16. In addition, there is no chemical reactions between vanadium oxide and platinum at the above temperature. The above conditions permit to obtain a low ohmic contact resistance and a good adhesion between the vanadium oxide film and the platinum film.

Platinum alone does not have a good adhesion to sapphire, glass or quartz. Therefore, when a sapphire, glass or quartz substrate is used, a titanium film is first deposited on the substrate and the platinum film is deposited over the titanium film. Other reactive metals could be used to enhance the adhesion of the platinum film, such as vanadium, molybdenum and tantalum.

The output leads of the device could be connected directly to the platinum film but the welding or bonding process is difficult to carry out. Consequently, a layer of gold 18 is first deposited on the platinum film 16 and the output wires welded to the gold contact 18. Similarly, other soft metals, such as aluminum, can be used to facilitate the lead bonding process.

Although the invention has been disclosed with reference to a preferred embodiment thereof, it is to be understood that various modifications may be made thereto and that the scope of the present invention is to be determined by the claims only.

We claim:

1. A thin film device having a low ohmic contact resistance comprising:

a. a plate-like substrate of electrically insulating material;

b. spaced platinum contacts deposited on the surface of said substrate; and c. a thin film of vanadium oxide having a thickness of from 1000 to 5000 A deposited over said substrate and bridging a portion of said spaced platinum contacts, said vanadium oxide having an ohmic contact resistance which is lower than 10 ohms and having a good adhesion with said platinum contacts.

2. A thin film device as defined in claim 1, wherein said substrate is made of a material selected from the group consisting of sapphire, polycrystalline alumina, beryllium oxide, quartz and glass.

3. A thin film device as defined in claim 2, wherein said material is selected from the group consisting of sapphire, quartz, and glass.

4. A thin film device as defined in claim 3, further comprising contacts of titanium material deposited on said substrate and wherein said spaced platinum contacts are deposited over said titanium contacts, said titanium material being used to enhance the adhesion of the platinum contacts to a substrate of sapphire, quartz or glass.

5. A thin film device as defined in claim 1, further comprising a gold layer deposited on the portions of said platinum contacts not covered by the vanadium oxide.

6. A thin film device as defined in claim 1, further comprising an aluminum layer deposited on the portions of said platinum contacts not covered by the vanadium oxide.

7. A thin film device as defined in claim 1, further comprising an overcoating of silicon dioxide placed over the vanadium oxide film.

8. A thin film device as defined in claim 1 wherein said thin film consists of vanadium dioxide.

* * * * *